(12) United States Patent
Li

(10) Patent No.: US 10,286,581 B2
(45) Date of Patent: May 14, 2019

(54) CENTRIFUGAL HOLLOW BASIC BODY FORMING METHOD AND DEVICE

(71) Applicant: Caiyou Li, Xiamen (CN)

(72) Inventor: Caiyou Li, Xiamen (CN)

( * ) Notice: Subject to any disclaimer, the term of this patent is extended or adjusted under 35 U.S.C. 154(b) by 194 days.

(21) Appl. No.: 15/362,311

(22) Filed: Nov. 28, 2016

(65) Prior Publication Data

US 2017/0157808 A1   Jun. 8, 2017

(30) Foreign Application Priority Data

Dec. 3, 2015   (CN) .......................... 2015 1 0880456

(51) Int. Cl.

| B29C 41/36 | (2006.01) |
|---|---|
| B29C 33/00 | (2006.01) |
| B29C 39/42 | (2006.01) |
| B29C 41/18 | (2006.01) |
| B29C 45/00 | (2006.01) |
| B29C 41/04 | (2006.01) |
| B29C 35/02 | (2006.01) |
| B29L 23/00 | (2006.01) |
| B29L 22/00 | (2006.01) |
| B29C 71/00 | (2006.01) |
| B29K 101/10 | (2006.01) |
| B29K 101/12 | (2006.01) |

(52) U.S. Cl.
CPC .......... B29C 41/36 (2013.01); B29C 33/0055 (2013.01); B29C 35/0266 (2013.01); B29C 39/42 (2013.01); B29C 41/045 (2013.01); B29C 41/18 (2013.01); B29C 45/0053 (2013.01); B29C 2045/0058 (2013.01); B29C 2071/0027 (2013.01); B29K 2101/10 (2013.01); B29K 2101/12 (2013.01); B29L 2022/00 (2013.01); B29L 2023/00 (2013.01)

(58) Field of Classification Search
None
See application file for complete search history.

(56) References Cited

U.S. PATENT DOCUMENTS 8,617,453 B2 *   12/2013   Mizoguchi ........ B29C 45/14065
264/503

\* cited by examiner

Primary Examiner — Monica A Huson
(74) Attorney, Agent, or Firm — Rabin & Berdo, P.C.

(57) ABSTRACT

A centrifugal hollow basic body forming method includes forming a parison that includes a superficial frozen layer and an inner uncured layer, by filling a model with material; and centrifuging to form the hollow basic body by causing the inner uncured layer to separate from the parison under centrifugal force generated by a centrifugation device and provide a separated uncured material. A centrifugal hollow basic body forming device includes a molding device structured to form a parison that includes a superficial frozen layer and an inner uncured layer; and a centrifugation device that generates a centrifugal force effective to separate the inner uncured layer from the superficial frozen layer as separated uncured material and form the hollow basic body, and that is provided with an overflow chamber for collecting the separated uncured material.

9 Claims, 3 Drawing Sheets

CENTRIFUGAL HOLLOW BASIC BODY FORMING METHOD AND DEVICE

FIELD OF THE INVENTION

The present invention relates to product molding field, especially to a centrifugal hollow forming method and device.

BACKGROUND OF THE INVENTION

Present hollow forming method mainly includes injection molding, blow molding, rotational molding, gas injection molding, fusible core molding and so on, the advantage and disadvantage analysis between the above method is: 1) For blow molding: advantage: simple technology, low fabrication cost and high production ability, thick product wall, wide range for adjustment, easy to fabricate big volume hollow product with thin wall; disadvantage: limited in material used, not high quality of product outer surface, with cold material scar, uneven wall thickness in non-circular product production; 2) For rotational molding: advantage: suitable for product of small batch and big volume, more beautiful of product appearance than blow molding, wall thickness uniformity and controllability both excellent; disadvantage: limited in material utilization, long molding cycle, high cost, big dimension error; 3) For gas-assisted injection molding: advantage: with same quality of product outer surface as injection molding, smaller internal stress and less material usage, wide material utilization range; disadvantage: not suitable for thin wall product fabrication, difficult in controlling and leading product inner gas path, big thickness difference in the location of gas path turning around, long molding cycle; 4) For fusible core molding: advantage: simplified the mould from complication, with precise inner dimension of hollow product, with same quality of product outer surface as injection molding; disadvantage: Before production, prepared low temperature metal fusible core should be placed in the mould, then, taking heating method to melt the core and clean residue, fabrication cost is high, due to melted flow impacting on the core during molding process, it's not applicable for certain hollow product without suitable supporting in the hole, additionally more requirement in material lead to unable to be wildly used.

SUMMARY OF THE INVENTION

The present invention is provided with a centrifugal hollow forming method. One technical solution to the above technical problems for the present invention is that:

A centrifugal hollow forming method, comprising following step:
1) Fill materials into model to form a parison which comprises a superficial frozen layer and an inner uncured layer;
2) Forming the hollow basic body by making the uncured layer separate from the parison under centrifugal force generated by a centrifugation device.

In another preferred embodiment, said air chamber and said surfboard body are connected by II shape isolation films, the space between isolation films forms independent air chamber.

In another preferred embodiment, also comprising an outlet hole making step after step 2), said outlet hole making step is to make an outlet hole on the frozen layer for the inner uncured layer going out.

In another preferred embodiment, also comprising an overflow material collection step after step 2), said overflow material collection step is to collect the separated uncured layer from the parison.

In another preferred embodiment, also comprising an air inflation step in step 2), said air inflation step is to prevent the frozen layer from collapsing under centrifugal force.

A centrifugal hollow forming device, comprising a molding device and a centrifugation device, said molding device is used to make the material form into a parison which comprises a superficial frozen layer and an inner uncured layer, said centrifugation device is used to generate centrifugal force for letting the uncured layer separate from the parison so that to a hollow basic body is formed.

In another preferred embodiment, said centrifugation device comprised a centrifuge with the function of generating centrifugal force for the uncured layer being separated from the parison.

In another preferred embodiment, said centrifugation device is provided with an overflow chamber for collecting the separated uncured layer from the parison.

In another preferred embodiment, said molding device is provided with an outlet hole making device to make an outlet hole on the frozen layer for the inner uncured layer going out.

In another preferred embodiment, said molding device and said centrifugation device are respectively provided with a first control device and a second control device, both said first control device and second control device are with the function of controlling the thickness of the frozen layer.

In another preferred embodiment, said overflow chamber is provided with an air inflator set inside.

Compared with existing technology, present invention takes use of molding device and centrifugation device, firstly using the molding device to make the material form into a parison which comprises a superficial frozen layer and an inner uncured layer, then using the centrifugation device to generate centrifugal force for letting the uncured layer separate from the parison so that to a hollow basic body is formed, the advantages of using the centrifugal hollow forming device are that with high quality of the outer surface of the hollow product and even wall thickness, with strong controllability on thickness and high dimensional stability, cyclic utilization of the collection of overflow material, and with low manufacture cost and wide application range.

Table 1 shows comparison of advantages and disadvantages between other hollow forming method in prior art.

DETAILED DESCRIPTION OF THE EMBODIMENTS

The present invention will be further described with drawing and embodiments to make the present invention more clear and well-known, but the following content will not limit the scope of the present invention.

Figure 1:
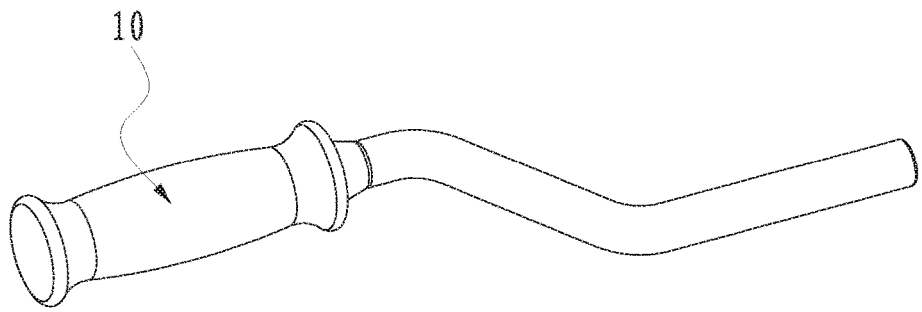
FIG. 1 illustrates an external view of the parison after molding in present invention of centrifugal hollow forming method.
Figure 2:
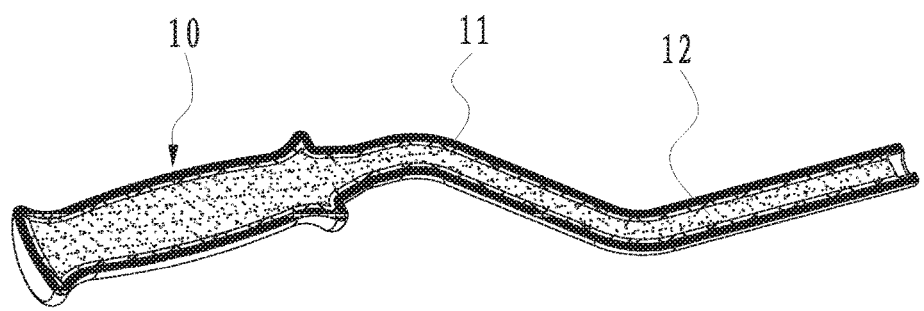
FIG. 2 illustrates a schematic diagram of internal structure of the parison of FIG. 1 after being cutting open in present invention of centrifugal hollow forming method.
Figure 3:
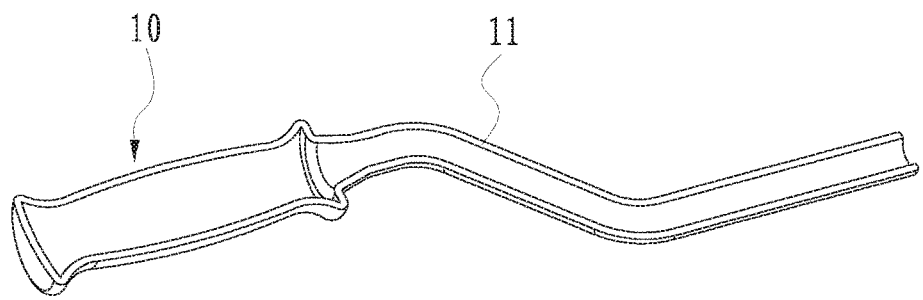
FIG. 3 illustrates a schematic diagram of internal structure of the parison of FIG. 2 after inner fusible core being removed in present invention of centrifugal hollow forming method.
Figure 4:
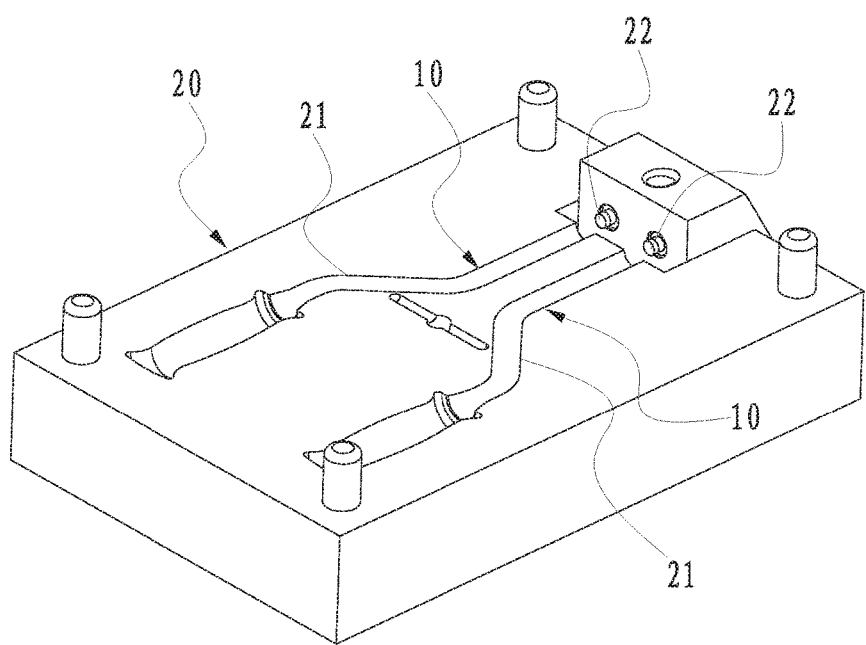
FIG. 4 illustrates a schematic diagram of the mould using to fabricate the parison shown in FIG. 1.
Figure 5:
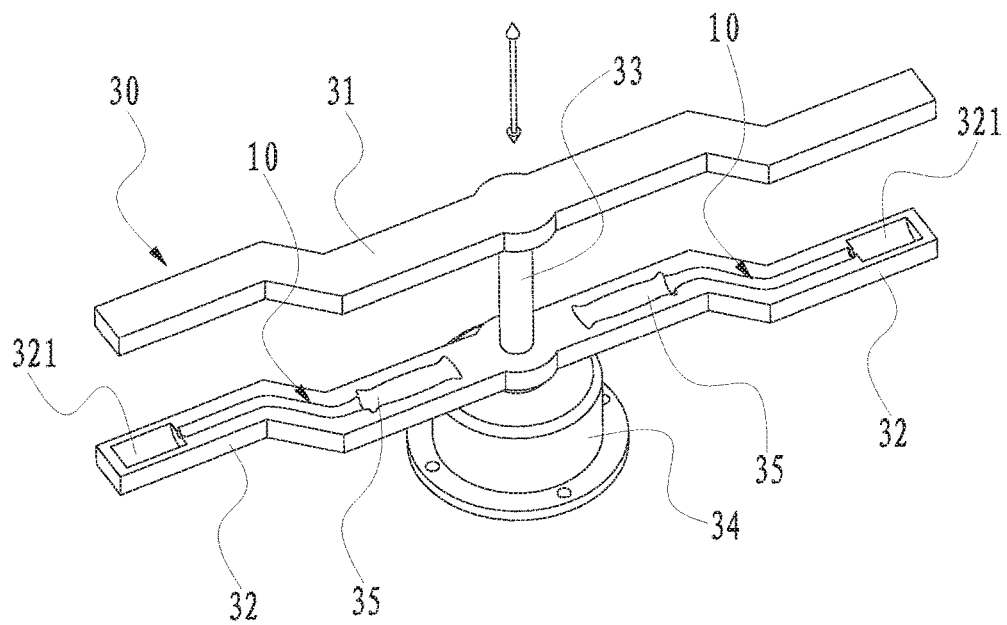
FIG. 5 illustrates one schematic diagram of the mould using to fabricate the parison with inner fusible core being removed shown in FIG. 3.
Figure 6:
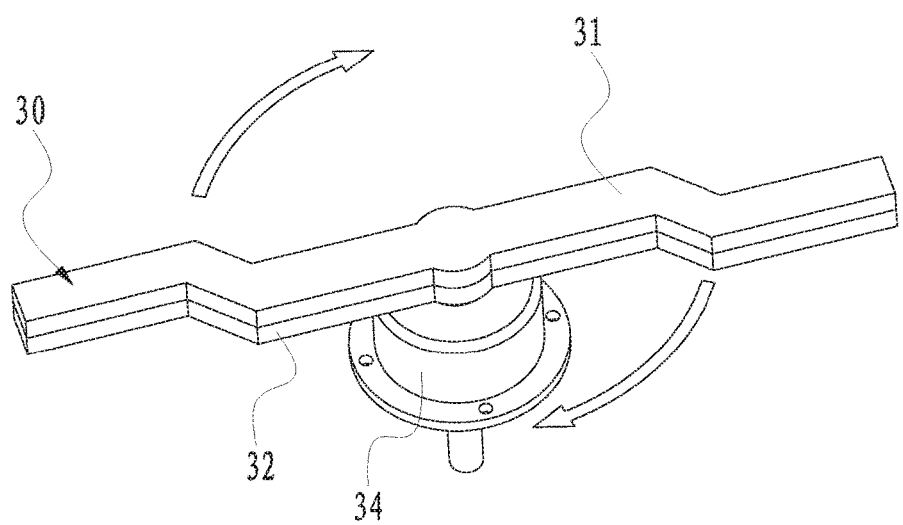
FIG. 6 illustrates another schematic diagram of the mould using to fabricate the parison with inner fusible core being removed shown in FIG. 3.

As FIG. 1 to FIG. 6 shown, a centrifugal hollow forming device, comprising a molding device 20 and a centrifugation device 30, the molding device 20 is used to make the material form into a parison 10 which comprises a superficial frozen layer 11 and an inner uncured layer 12, the centrifugation device 20 is used to generate centrifugal force for letting the uncured layer 12 separate from the parison 10 so that to a hollow basic body is formed.

As FIG. 1 to FIG. 6 shown, one embodiment of present invention is that, the centrifugation device 30 is provided with an upper rotation mould 31, a lower rotation mould 32, rotation axis 33 and centrifuge 34, upper rotation mould 31 and lower rotation mould 32 are with upper and lower parallel arrangement as well as with same mould shape to match the shape of parison 10. The lower rotation mould 32 is set with a groove 35 inside to place parison 10, while the upper rotation mould 31 is provided with an accommodating groove (not shown) to cover on the parison 10, rotation axis 33 goes through both center of the upper rotation mould 31 and lower rotation mould 32, and the upper rotation mould 31 could make up and down movement along rotation axis 33 with respect to the lower rotation mould 32, rotation axis 33 goes through the center of centrifuge 34, the lower rotation mould 32 is set on the top surface of centrifuge 34 through rotation axis 33, centrifuge 34 could drive rotation axis 33 rotate then leading to horizontal rotation of upper rotation mould 31 and lower rotation mould 32, in the rotary process, uncured layer 12 separates from the parison 10 under centrifugal force so that a hollow basic body is formed. When parison 10 is preliminary formed, an outlet hole (not shown) should be opened on superficial frozen layer 11 of parison 10, so that uncured layer 12 could go out from parison 10 through the outlet hole, the outlet hole is made by an outlet hole making device (not shown) which takes method of heating, punching on the superficial frozen layer 11 to make the outlet hole. The molding device 20 is provided with a heatable core 22, which is used to prevent the venting outlet of the mould making parison 10 from being blocked by frozen material. The centrifuge 34 is provided with a motor (not shown) and a speed changing device (not shown), lower rotation mould 32 of centrifugation device 30 is provided with an overflow chamber 321 which is used to collect the separated uncured layer 12 from the parison 10, material collected by overflow chamber 321 could be recycled for further manufacture utilization. For producing product with thin thickness requirement, there is an air inflator (not shown) set in overflow chamber 321, in order to add compressed air into the parison 10 to prevent thin superficial frozen layer 11 from collapsing under centrifugal force. For high dimension requirement in product producing, the air inflator is also set in overflow chamber 321, just for product obediently attaching to the mould during cooling process until completely frozen. Molding device 20 and centrifugation device 30 are respectively provided with a first control device (not shown) and a second control device (not shown), the first control device and the second control device are both used for temperature setting and heating time controlling to control the forming thickness of superficial frozen layer 11.

In the process of fabrication, firstly produce parison 10 by molding device 20, meanwhile adjust thickness of frozen layer by mould temperature and cooling time setting according product wall thickness requirement, also could form different thickness in partial area by partial temperature regulation in the mould, then move parison 10 into centrifugation device 30, uncured layer 12 in parison 10 would be thrown out from parison 10 under centrifugal force generated by centrifugation device 30, finally get expected hollow product by removing unnecessary edge of parison 10.

Comparison of product appearance and dimensional properties between other hollow forming method in prior art as follow table 1 shown:

TABLE 1

| Method | Quality of product outer surface | Wall thickness uniformity | Wall thickness controllability | Material utilization range | dimensional stability | manufacture cost |
|---|---|---|---|---|---|---|
| Blow molding | poor | poor | excellent | medium | poor | low |
| Rotational molding | medium | excellent | excellent | Very narrow | poor | Very high |
| gas-assisted injection molding | excellent | poor | poor | wide | excellent | medium |
| Fusible core molding | excellent | excellent | excellent | medium | excellent | high |

Product produced by present invention of centrifugal hollow forming device are with high quality of the outer surface, excellent wall thickness uniformity, with strong controllability on thickness, material utilization range very wide, moderate low manufacture cost.

In other embodiment, molding device 20 could take different wall thickness control method and outlet hole making method with respect to different material properties of different product, molding device 20 and centrifugation device 30 could be in integrated setting, the centrifugal hollow forming device and method is used but not limited used on thermoplastic or thermosetting material, also could be used on other material product fabrication, such as certain material become frozen in the process of chemical reaction between parison surface and oxygen in the air, that is applicable to this forming technology.

In summary, the centrifugal hollow forming device present invention takes use of molding device 20 and centrifugation device 30, firstly using the molding device 20 to make the material form into a parison 10 which comprises a superficial frozen layer 11 and an inner uncured layer 12, then using the centrifugation device 30 to generate centrifugal force for letting the uncured layer 12 separate from the parison 10 so that to a hollow basic body is formed, the advantages of using the centrifugal hollow forming device are that with high quality of the outer surface of the hollow product and even wall thickness, with strong controllability on thickness and high dimensional stability, cyclic utilization of the collection of overflow material, and with low manufacture cost and wide application range.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. A centrifugal hollow basic body forming method, comprising:
    forming a parison that includes a superficial frozen layer and an inner uncured layer, by filling a model with material; and
    centrifuging to form said hollow basic body by causing the inner uncured layer to separate from the parison under centrifugal force generated by a centrifugation device and provide a separated uncured material.

2. The centrifugal hollow basic body forming method according to claim 1, further comprising, after centrifuging, making an outlet hole through the superficial frozen layer to facilitate outflow of the separated uncured material.

3. The centrifugal hollow basic body forming method according to claim 1, further comprising, after centrifuging, collecting the separated uncured material from the parison.

4. The centrifugal hollow basic body forming method according to claim 1, further comprising inflating the prison with compressed air during centrifuging to prevent the superficial frozen layer from collapsing under the centrifugal force.

5. A centrifugal hollow basic body forming apparatus, comprising:
    a molding device structured to form a parison that includes a superficial frozen layer and an inner uncured layer; and
    a centrifugation device that generates a centrifugal force effective to separate the inner uncured layer from the superficial frozen layer as separated uncured material and form said hollow basic body, and that is provided with an overflow chamber for collecting the separated uncured material.

6. The centrifugal hollow basic body forming apparatus device according to claim 5, wherein said centrifugation device comprises a centrifuge.

7. A centrifugal hollow basic body forming apparatus, comprising:
    a molding device that is structured to form a parison that includes a superficial frozen layer and an inner uncured layer; and
    a centrifugation device that generates a centrifugal force effective to separate the inner uncured layer from the superficial frozen layer as separated uncured material and form said hollow basic body,
    wherein said molding device is provided with an outlet hole making device that makes an outlet hole through the superficial frozen layer to facilitate outflow of the separated uncured material.

8. The centrifugal hollow basic body forming device according to claim 5, wherein said molding device and said centrifugation device are respectively provided with a first control device and a second control device, both said first control device and second control device being configured to control thickness of the superficial frozen layer.

9. The centrifugal basic body forming device according to claim 5, wherein said overflow chamber is provided with a compressed air inflator disposed therein to prevent the superficial frozen layer from collapsing under the centrifugal force.

* * * * *